June 4, 1974   J. N. PARRIS   3,814,593
PRESSURE MOLDING OF GLASS ARTICLES APPARATUS
Original Filed Oct. 21, 1970   2 Sheets-Sheet 1

United States Patent Office 3,814,593
Patented June 4, 1974

3,814,593
PRESSURE MOLDING OF GLASS
ARTICLES APPARATUS
Joseph N. Parris, Irwin, Pa., assignor to PPG
Industries, Inc., Pittsburgh, Pa.
Original application Oct. 21, 1970, Ser. No. 82,768, now Patent No. 3,725,023. Divided and this application Jan. 5, 1973, Ser. No. 321,498
Int. Cl. C03b 11/00
U.S. Cl. 65—305                              4 Claims

ABSTRACT OF THE DISCLOSURE

Apparatus for pressure forming glass sheets, in particular hemispheres, by casting molten glass under pressure between graphite molds while the molds are maintained within a desired temperature range below a temperature at which molten glass adheres to graphite and above a temperature at which the molds cause chill cracking and optical defects in the surfaces of the cast glass.

This is a division of application Ser. No. 82,768, filed Oct. 21, 1970, now U.S. Pat. No. 3,725,023, granted Apr. 3, 1973.

BACKGROUND OF THE INVENTION

The present invention relates to apparatus for pressure forming glass shapes from molten glass. While the present invention resulted from a need to improve the characteristics of glass hemispheres, the techniques taught by the present invention are also suitable for the formation of a variety of glass shapes, for example, structural shapes such as I-beams and the like, glass statues, and any other desired glass shape.

One important end product made possible by the present invention is a hollow glass sphere having a nominal wall thickness of at least one half inch and an outside diameter in excess of twelve inches. These spheres are produced by laminating a pair of hemispheres fabricated according to the present invention along their "equators." A preferred method of joining hemispheres together is described in U.S. Pat. No. 3,450,080 to Henry M. Demarest, Jr. Spheres so produced have found great utility as containers for instruments in deep submergence studies under water.

Prior to the present invention, flat slabs of glass were formed into hemispherical shapes either by sag bending, for example, by a technique described in U.S. Pat. No. 3,560,183 of George W. Stilley and John A. Comperatore, for Bending Glass Sheets, or by a combination of gravity sagging and pressure bending as described in U.S. Pat. No. 3,414,395 to Thomas J. Reese and Russell J. Corsi.

While such prior art techniques produced hemispheres of the desired shape, it was difficult to handle the flat slab that formed the work piece for making the hemisphere. In addition, hemispheres so formed have mold marks on their surface that require polishing for removal and difficulty was encountered in controlling the uniformity of thickness of hemispherical shapes so produced. Thus, it was often necessary to grind the thicker parts of the hemispheres whenever uniformity of thickness was required.

The present invention provides apparatus for forming glass into a desired shape, preferably a hemispherical shape. The method, performed by apparatus conforming to the present invention involves establishing a space of desired thickness between a pair of graphite molds of male and female configuration, respectively, that defines the desired shape, melting and refining more glass than is needed to fill said space, forcing said melted and refined glass upward at superatmospheric pressure into the space between said molds until said space is completely filled with said glass while maintaining said molds at a minimum temperature sufficient to obtain momentary temperature equilibrium at the glass-mold interfaces above the glass annealing point and below a temperature at which the glass adheres to the mold. In a preferred embodiment of the present invention, the male mold is over the female mold.

The temperature of the molds is then cooled at a controlled rate to control the rate of cooling the glass. When the mold temperatures are within a temperature range at which said glass is sufficiently viscous to maintain its shape, yet still above its strain point, the male mold is retracted upward from the body of glass sufficient distance to permit free thermal contraction of the cooling glass from the cooling female mold. The female mold continues to support the glass until the glass is cooled to below its strain point.

The glass is melted within a chamber that is capable of being pressurized with a non-oxidizing gas and preferably an inert gas such as argon. The pressure forces the molten glass to rise through a delivery tube into the established space at a relatively rapid rate.

In the past, molten metal, but not glass, has been pressure cast using cold graphite molds, as shown in U.S. Pat. No. 2,839,801 to Zickefoose. The use of cold graphite molds is not suitable for pressure casting glass sheets because when the glass set on contacting the cold mold, such setting produces chill cracking and optical flaws in the glass surface. Furthermore Zickefoose uses air to pressurize the molten glass for pressure casting. Air oxidizes the graphite molds heated by the molten metal introduced therebetwee and spoils the shape of the mold cavity.

It has also been attempted to gravity cast molten glass in a mold at a temperature of about 2500 degrees Fahrenheit. The molten glass adheres to the mold at such high temperatures. As a result, using such a hot mold for casting glass is a slow and tedious process and requires a subsequent grinding operation to remove the mold portion that adheres to the glass surface. The hot mold cannot be reused unless reworked.

The present invention provides upward pressure casting rather than gravity feed to molten glass and avoids the need of grinding to remove an adhered mold from the surface of a cast glass article by controlling the temperature of the graphite mold during pressure casting so that the mold-glass interface attains a desired temperature range above the annealing point of the glass, and below the temperature at which graphite would react chemically with or adhere to the glass. Furthermore, the present invention uses a non-oxidizing or an inert atmosphere to further avoid chemical reaction between the molten glass and the mold or oxidation of the mold.

BRIEF DESCRIPTION OF THE DRAWINGS

The present invention will be better understood in the light of the description of a specific embodiment thereof.

In the drawings forming part of the description and wherein like reference numbers refer to like structural elements.

DESCRIPTION OF THE PREFERRED EMBODIMENT

Figure 2:
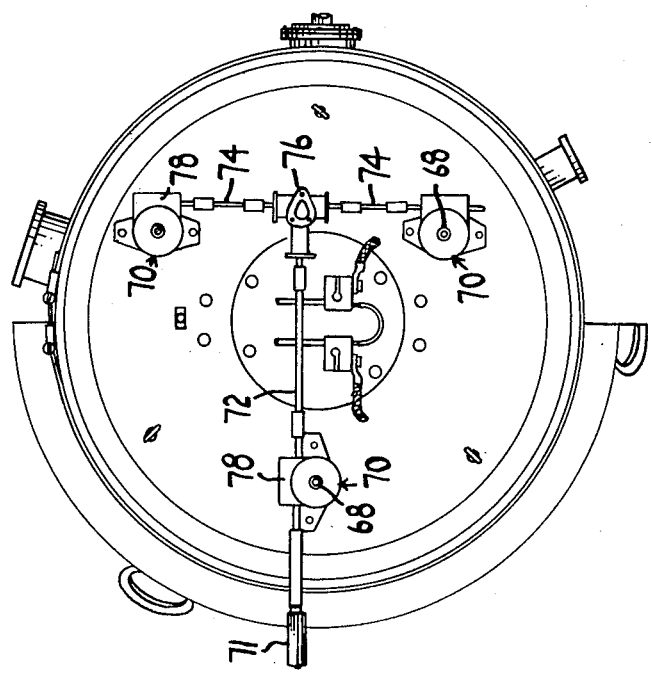
FIG. 2 is a plan view of the apparatus illustrated in FIG. 1.
Figure 1:
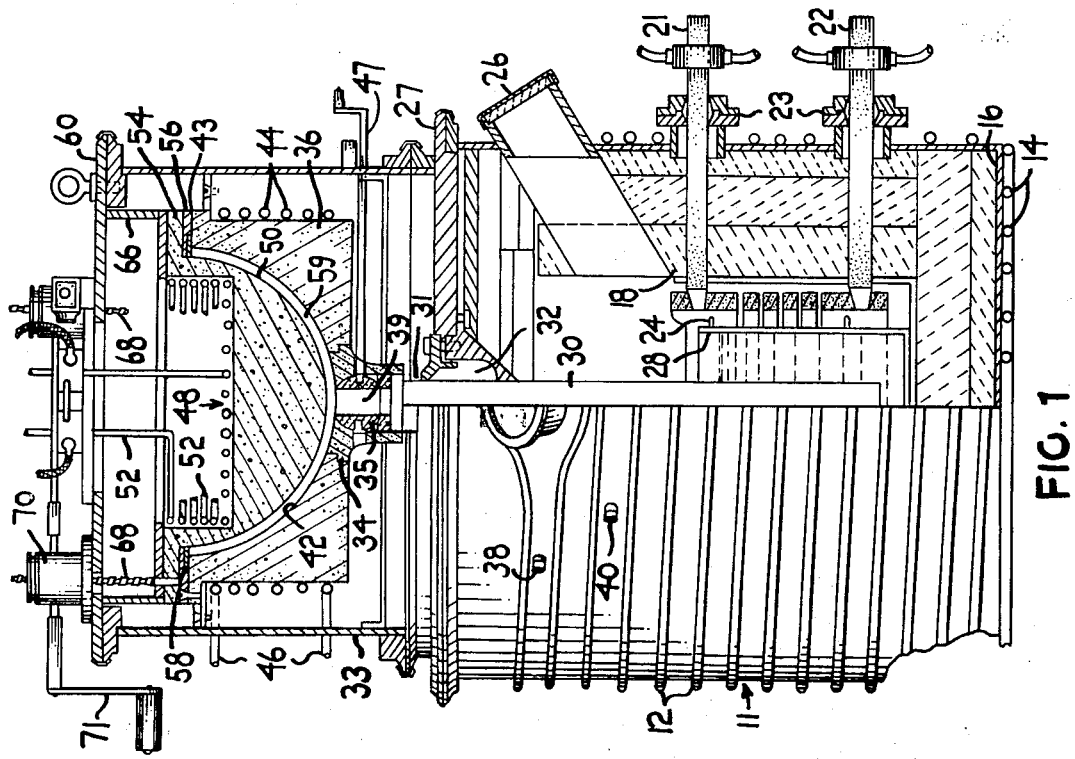
FIG. 1 is an elevational view, partly in section, of an illustrative embodiment of apparatus for performing the present invention for producing hemispheres.

The apparatus comprises a cylindrical steel pressure shell 11 surrounded by water cooled pipes 12 of copper brazed to the outer wall of the shell by a silver solder. It is understood, however, that the pressure shell may be of other shape than cylindrical, such as a rectangular cross-section. Additional cooling pipes 14 are coiled below the floor 16 of the pressure shell 11. A furnace 18 of refractory material is supported within the pressure shell 11 by suitable insulation such as a graphite felt.

A pair of graphite bus bars 21 and 22 connected to a voltage source (not shown) extend through the wall of the pressure shell and continue through the insulation of a wall of the furnace 18. The bus bars are connected electrically to one another through a helical graphite heating element 24 supported on the wall of the furnace 18. While graphite is specified for the bus bars and heating elements, other high temperature electroconductive materials, such as tungsten, molybdenum and the like, may also be used. A window 26 is provided to present an obliquely downward line of sight through the wall of the pressure shell 11 and into the furnace 18. A steel cover 27 is attached to the pressure shell 11 to enclose the pressure shell and the furnace.

Centrally disposed within the furnace is a container 28. A delivery pipe 30 is concentrically mounted to extend from a short distance above the bottom of the container 28 vertically upward through an opening 31 in the cover 27 where the pipe 30 is supported by a packing gland 32. The upper end of the pipe 30 extends through the floor of a mold housing 33 of steel and terminates adjacent an adapter 34 for a ball valve 35 supported in the lowest portion of a female mold 36 within the mold housing 33. The adapter and valve are composed of graphite as is the female mold 36. It is understood that while a ball valve is disclosed, it is equally feasible to use a slide valve or any other suitable valve to disconnect a mass of molten glass above the female mold 36 from the molten glass in delivery tube 30.

A pressure pipe 38 is connected to a source of argon and extends therefrom into the pressure shell 11. A pressure relief pipe 40 having an adjustable valve extends from within the pressure shell 11 to outside the pressure shell 11 to relieve the pressure within the pressure shell when needed. The furnace 18 and the container 28 are exposed to the pressure within the pressure shell 11. Pipes 38 and 40 are valved for pressure control.

The female mold 36 has an upward facing shaping surface 42 of hemispherical shape terminating in a peripheral shoulder 43 and is surrounded by electroconductive tubes of Inconel 44 helically wound about the outer wall of the female mold. The Inconel tubes are connected to lead in tubes 46, which are in turn connected to a source of voltage. In addition, water or other cooling medium can be circulated through the tubes 44 and 46 to provide a means for controlling the temperature of the female mold 36.

Figure 3:
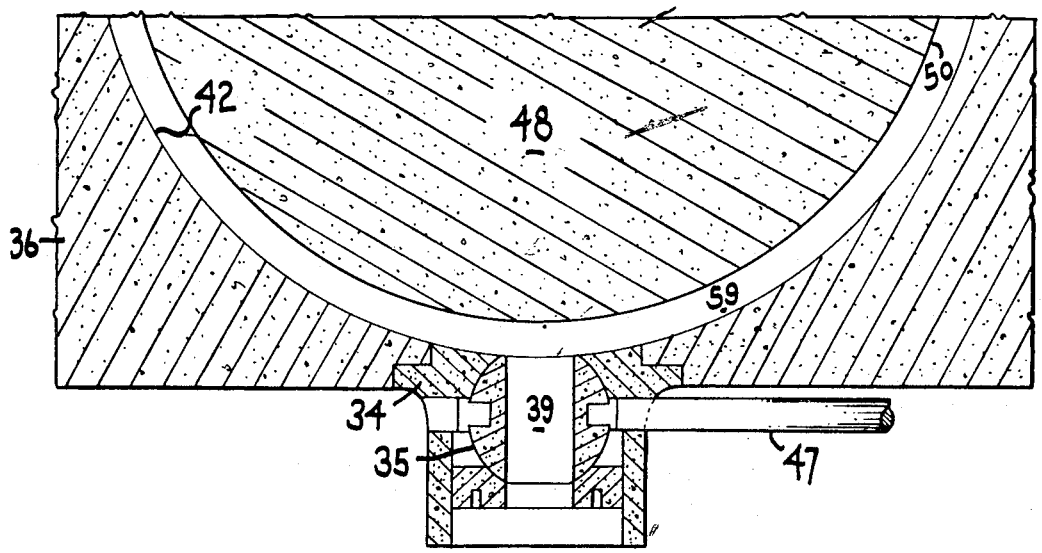
FIGS. 3 and 4 are enlarged fragmentary sectional views of a valve forming part of the illustrative embodiment, shown in its open and closed position, respectively.
Figure 4:
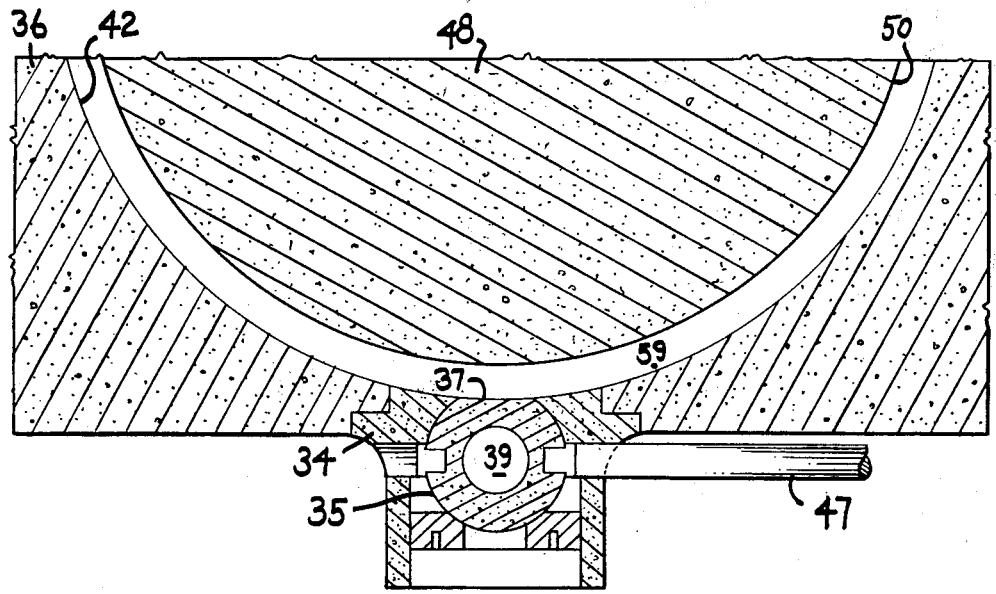

A valve stem 47 is connected to the valve 35 and rotates the latter about the axis of the valve stem between an open position shown in FIG. 3 and a closed position seen in FIG. 4. The ball valve 35 is substantially spherical except for a concave recess 37 (FIG. 4) intermediate ends of an aperture 39 extending through the ball valve 35. The concave recess 37 provides a smooth continuation of the upper surface 42 of the female mold 36 when valve 35 is in the closed position of FIG. 4.

The apparatus also comprises a male mold 48 having a downward facing surface 50 complementary to the upper surface 42 of the female mold 36. The male mold 48 is disposed above the female mold 36. The central portion of the male mold 48 is recessed to receive Inconel tubes 52 similar to the Inconel tubing 42 and 46 provided in the female mold 36. The upper portion of the male mold 48 is provided with a peripheral flange 54 superimposed over the peripheral shoulder 43 of the female mold 36. A stainless steel ring 56 having a graphite insert 58 is disposed between the lower surface of the flange 54 of the upper male mold 48 and the peripheral shoulder 43 of the lower female mold 36. The graphite insert 58 is disposed across the upper portion of the space 59 existing between the downward facing surface 50 of the male mold 48 and the upward facing surface 42 of the female mold 36 to serve as a cover and retainer for glass delivered into said space 59.

A metal cover 60 is provided above the upper mold 48. The cover is attached to the mold housing 33. The latter is concentric with and immediately above the roof 27 of the pressure shell 11 to which it is suitably attached.

The mold covering 60 is suitably reinforced by a box like structure 66. The cover 60 and the box like structure are apertured to receive the Inconel tubes 52. Three additional apertures are provided to receive externally threaded shafts 68 of jacks 70 operated in unison by a crank 71 off a main shaft 72, auxiliary shafts 74, and bevel gearing 76 and 78. The jacks operate to retract the male mold 48 upwardly from the female mold 36 either simultaneously with or shortly after the glass fills the hemispherical space 59. The steel ring 56 with its graphite insert 58 retains the glass hemisphere against the upper surface 42 of the female mold 36 when the jacks 70 lift the male mold 48.

The following examples are provided to indicate how the present invention is used to form glass hemispheres of different sizes presently in demand.

EXAMPLE I

Hemispheres of 13 inch outer diameter and one half inch thick were produced of the following glass composition: 61 weight percent of $SiO_2$; 15.5 weight percent of $Al_2O_3$; 10 weight percent of $B_2O_3$; 4.5 weight percent of $Li_2O$ and 9 weight percent of $MgO$. This composition has an annealing point of 1055 degrees Fahrenheit. Its viscosity-temperature curve is approximately equal to that of commercial soda-lime-silica plate glass. The molds used were of dense grade graphite, National Carbon Company grade ATJ. This graphite has a maximum grain size of .006 inch diameter, and an ash content of 0.2%, a bulk density of 1.73 grams per cubic centimeter, a flexural strength of 3300 pounds per square inch and an electrical resistivity of $11.70 \times 10^{-4}$ ohm centimeters. The male spherical mold weighed 30 pounds and had a diameter of twelve inches. The female mold weighed approximately 40 pounds and had an upper surface of 13 inches in diameter. If less dense graphite is available, it is necessary to use heavier molds than those used in the reported experiments to obtain an equally good quality of glass surface finish.

The glass composition was heated to a temperature of 2680 degrees Fahrenheit. The molds were held at temperatures of 900 degrees Fahrenheit. A supply tank of argon was used to supply the argon at a regulated pressure of 55 pounds per square inch delivered through a ⅛ inch diameter orifice to pressure pipe 38. This resulted in the application of a pressure of 18.2 pounds per square inch in the pressure shell 11 and furnace 18. This pressure forced the molten glass through the delivery pipe 30 to fill up the space 59 between the molds in 8.1 seconds. About 10 pounds of molten glass was delivered to the mold through the delivery pipe 30 having an inner diameter of 1¼ inches and composed of a refractory sold under the trade name of Masrock by the Glassrock Corporation of Atlanta, Ga. Thus, approximately 1.2 pounds of molten glass per second was delivered to the aperture between the molds.

As a result of filling the space 59 between the molds, the molds and the glass reached a momentary equilibrium temperature of about 1130 degrees Fahrenheit at their contacting surface layers within 90 seconds of initial contact. When the space between the molds was filled, the valve 35 in the delivery system from the delivery pipe 30 to the space 59 between the molds was rotated from the open position depicted in FIG. 3 to the closed position depicted in FIG. 4, and crank 73 was operated to cause the jacks 70 to operate in unison to lift the male mold 48 about ⅝ inch, to increase its vertical distance from the female mold 36. The molds were then cooled at a slow controlled rate of approximately 30 degrees Fahrenheit per hour. Then, the upper mold was separated from the lower mold and the frozen glass hemisphere remaining in the space 49 was removed from the lower mold. It had uniform thickness and good optical surfaces and conformed accurately to the hemispherical shape desired.

EXAMPLE II

Glass hemispheres of the same composition as Example I having a 56 inch outside diameter and 1½ inch thickness are produced by forcing the molten glass, heated to a temperature of 2680 degrees Fahrenheit between an upper male mold and a lower female mold having diameters of 53 inches and 56 inches respectively. The molds are maintained at approximately 900 degrees Fahrenheit before the forced passage of the molten glass into the space between the molds. A delivery rate of 45 pounds per second results using a regulated pressure of approximately 110 pounds per square inch of nitrogen applied through an orifice of one half inch diameter, which results in pressurizing the pressure shell 11 at a pressure of approximately 60 pounds per square inch. The molten glass is supplied to the space between the molds through a delivery pipe having an inside diameter of six inches. Suitable glass hemispheres weighing 670 pounds having a wall of uniform thickness 1½ inches thick are delivered to the space 59 between a male mold weighing 1350 pounds and a female mold weighing 1675 pounds in about 15 seconds. Then, the upper male mold is lifted 1½ inches and the mold housing 33 with the interfacial surfaces of glass and molds at a momentary equilibrium temperature of between 1100 and 1150 degrees Fahrenheit. Then the separated complementary male and female molds are cooled at a controlled rate of approximately 15 degrees Fahrenheit per hour to anneal the glass hemisphere and retain its thickness and optical surfaces.

The experiments reported above and other experiments performed to produce hemispheres of intermediate sizes determined a preferred viscosity for the glass to be less than $10^9$ poises and greater than $10^7$ poises during pressure casting. The male mold should be retracted from the female mold when the glass is at a viscosity within the range of $10^9$ poises to $10^{11}$ poises, preferably at approximately $10^{10}$ poises. A minimum retraction should be a distance sufficient to enable the glass hemisphere, which contracts at a greater rate of thermal contraction than the graphite molds, to retract away from the upper surface 42 of the lower female mold 36 without engaging the lower surface 50 of the upper male mold 48, yet not such a large distance as to lose the benefits of heat exchange by radiation between the upper mold and the glass. For presently popular hemisphere sizes (one half inch thickness for 13 inch outer diameter to 1½ inches thickness for 56 inch outer diameter), the preferred range of separation during annealing ranges from 3 to 5 percent of the hemisphere diameter.

The mass of the graphite molds relative to the mass of molten glass introduced between the molds is an important factor in promoting optimum surface finish and successful annealing. The thermal conductivity of the graphite used in the mold determines the relative mass needed. For best results, each mold should weigh from 2 to 20 times the weight of glass cast between the molds. Temperature control during annealing is hard to keep for lower relative mold masses and greater mold masses require maintaining mold temperatures approaching the point at which molten glass adheres to graphite in order to maintain an initial glass cooling rate slow enough to avoid breakage due to stress established during cooling.

Optimum surface finish is obtained when the surfaces of the molten glass that contact the mold surfaces attain a temperature about 50 to 100 degrees Fahrenheit above the annealing point of the glass in the short time that the main body of molten glass is delivered to the space formed between the graphite molds. This is a surface phenomenon only and does not affect the temperature of the main body of molten glass immediately. The temperature of the main body of molten glass is lowered slowly at rates sufficiently slow to anneal the glass without causing fracture.

The form of the invention shown and described herein represents an illustrative preferred embodiment thereof. It is understood that various changes may be made without departing from the spirit of the invention as defined in the subject matter that follows.

I claim:

1. An apparatus for forming molten glass into a desired shape comprising:
   a pair of upper and lower complementary mold members, each having complementary shaping surfaces spaced from one another to provide a mold cavity therebetween, the lower of said mold members being provided with an opening communicating with said mold cavity,
   a pair of heat controlling means for selectively maintaining the temperature of said mold members at the surfaces of the cavity therebetween either at (A) a temperature above the annealing point of the glass and below the temperature at which the glass adheres to the mold members and (B) the temperature at which the glass in the mold cavity is sufficiently viscous to maintain its shape, each of said heat controlling means being disposed in heat transfer relation to one of said mold members,
   a glass melting chamber adapted to contain a body of molten glass, said chamber being provided with a gas inlet opening,
   means for supplying a non-oxidizing gas under pressure through said gas inlet opening to apply pressure to the molten glass in said chamber, and
   means for continuously delivering molten glass under the pressure exerted by said non-oxidizing gas from said glass melting chamber and form a location within the body of said molten glass through said opening in the lowermost of the lower mold member communicating with said mold cavity into said mold cavity until said mold cavity is substantially filled with said molten glass.

2. The apparatus of claim 1 wherein said apparatus includes means for retracting one of said mold members a distance sufficient to permit thermal contraction of the shaped cooling glass in said cavity.

3. Apparatus as in claim 1, wherein said mold members each have a mass between approximately two times and ten times the mass of a body of glass completely filling said mold cavity.

4. A mold as in claim 1, wherein said molds are composed of graphite.

References Cited

UNITED STATES PATENTS

| | | | |
|---|---|---|---|
| 1,742,098 | 12/1929 | Rankin | 65—304 X |
| 3,680,995 | 8/1972 | Frazier | 425—243 X |
| 3,420,644 | 1/1969 | Lirones et al. | 65—374 X |

FOREIGN PATENTS

| | | |
|---|---|---|
| 501,865 | 3/1939 | Great Britain. |

ROBERT L. LINDSAY, Jr., Primary Examiner

U.S. Cl. X.R.

65—319, 324; 425—243

UNITED STATES PATENT OFFICE
CERTIFICATE OF CORRECTION

Patent No. 3,814,593    Dated June 4, 1974

Inventor(s) Joseph N. Parris

It is certified that error appears in the above-identified patent and that said Letters Patent are hereby corrected as shown below:

Claim 1, Column 6, line 44, "form" should be ---from---.

Signed and sealed this 1st day of October 1974.

(SEAL)
Attest:

McCOY M. GIBSON JR.  
Attesting Officer

C. MARSHALL DANN  
Commissioner of Patents